Feb. 21, 1967  T. R. BARBER  3,304,700
COMBINED LAWN MOWER AND EDGER
Filed April 7, 1964  2 Sheets-Sheet 1
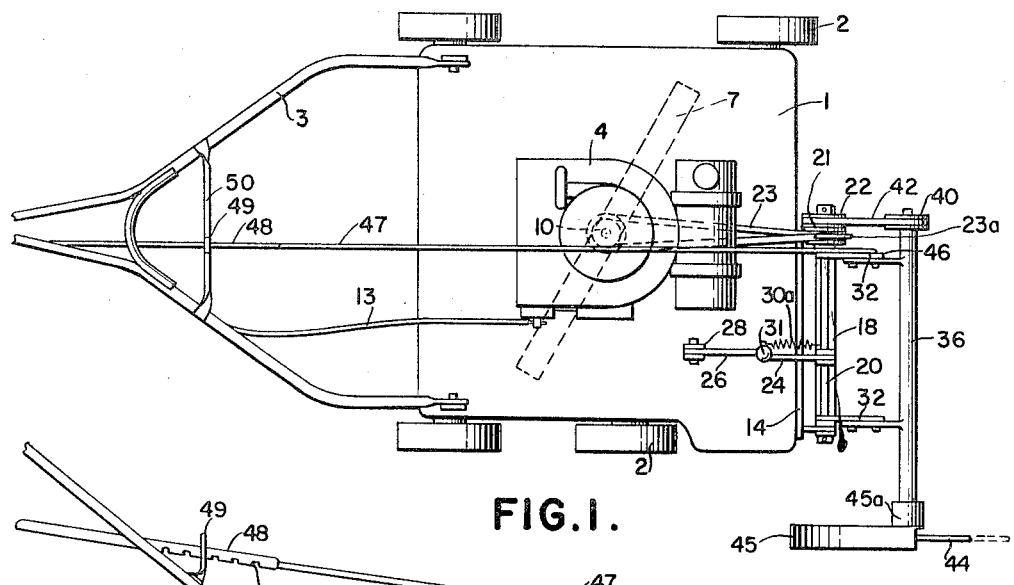
FIG.1.
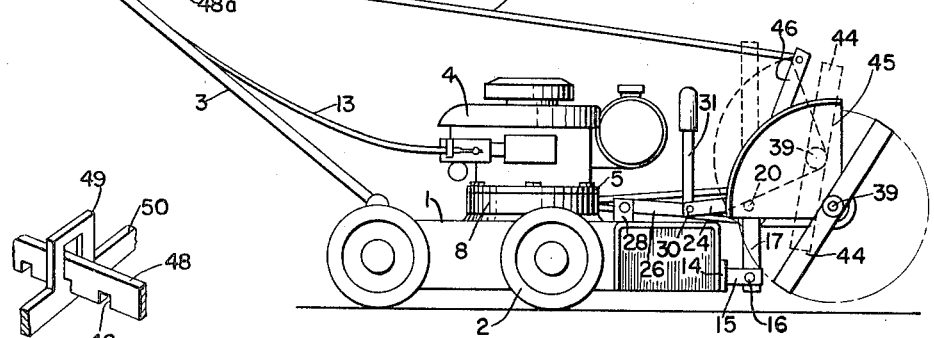
FIG.2.
FIG.7.
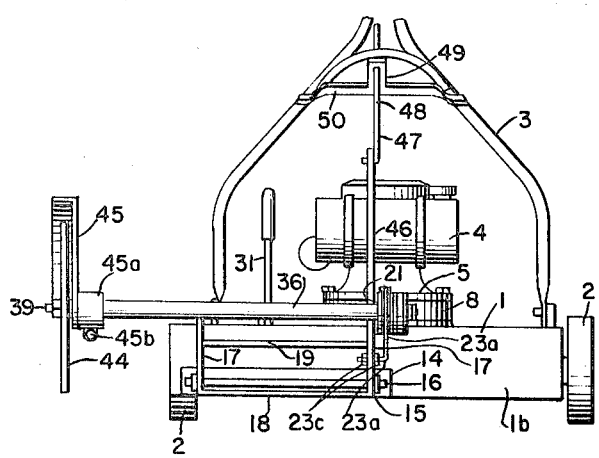
FIG.3.
FIG.8.
INVENTOR
Thomas R. Barber
BY J. Hanson Boyden
ATTORNEY

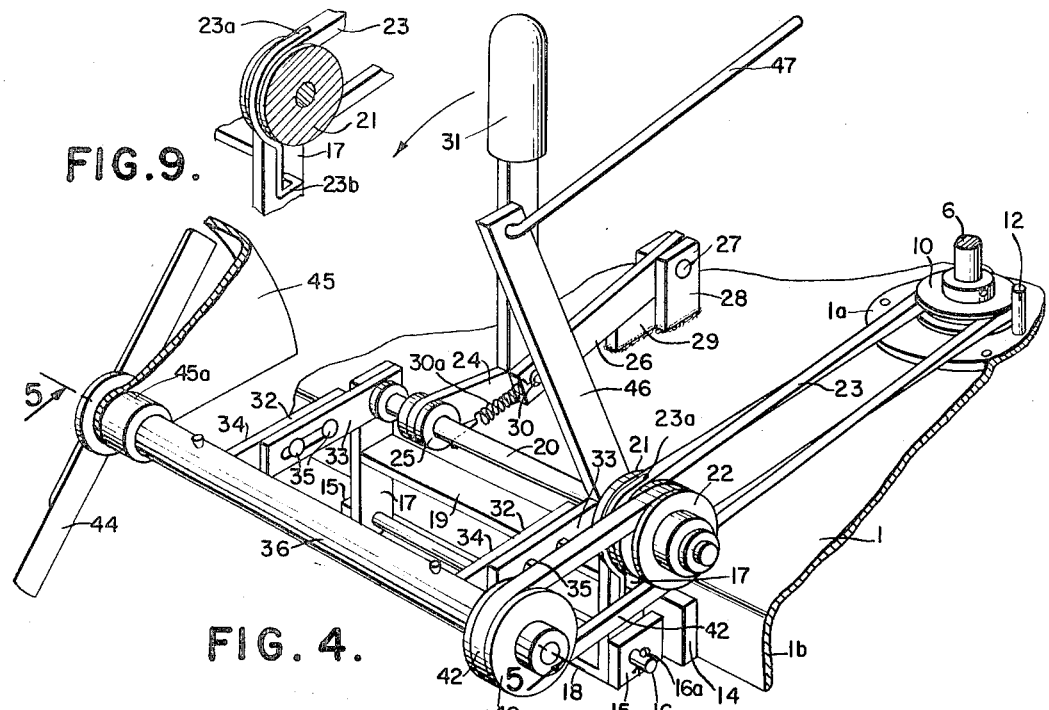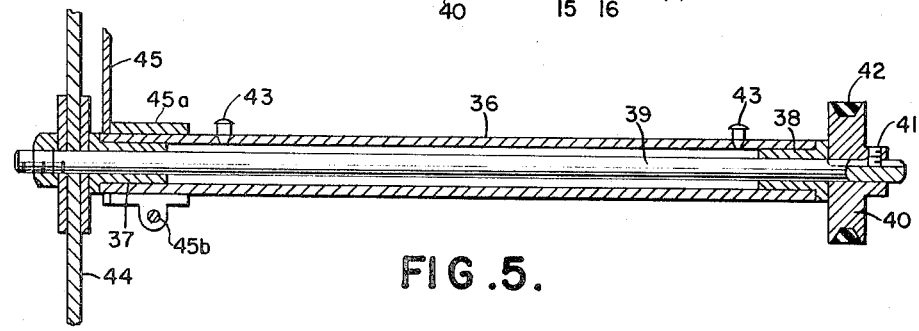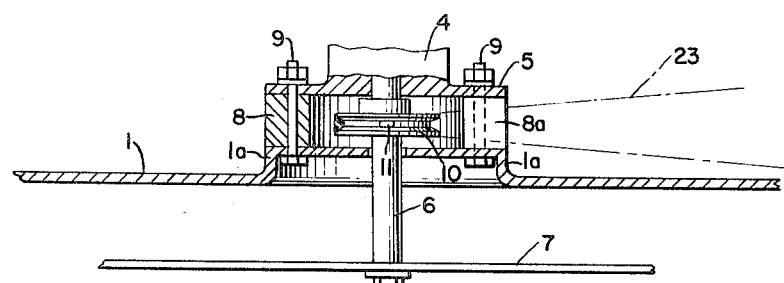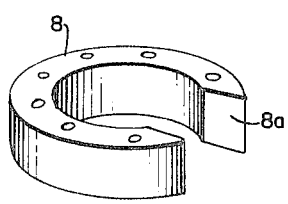

United States Patent Office 3,304,700
Patented Feb. 21, 1967

3,304,700
COMBINED LAWN MOWER AND EDGER
Thomas R. Barber, 423 Pablo Trail,
Lakeland, Fla. 33803
Filed Apr. 7, 1964, Ser. No. 357,925
12 Claims. (Cl. 56—25.4)

This invention relates to lawn mowers, and more particularly to a combined lawn mower and edger.

An object of the invention is to provide an edger construction in the nature of an attachment to the mower proper, so that the mower may be used with or without the edger. A related object is to so construct the mower that it may be made and sold independently, and that the edger attachment may be purchased subsequently and applied by the dealer to the mower owned by the purchaser. Also, if the purchaser initially buys the complete combination, he may subsequently buy a new mower and continue to use the original edger attachment.

The mower is of the so-called "rotary" type, equipped with an engine having a vertical shaft, and another object of the invention is to devise improved means whereby a power take-off pulley can be secured to this shaft and the edger attachment driven by belts from this power take-off pulley.

Still another object is to provide means whereby the height of the edger may be adjusted as desired, and a further object is to so construct and arrange the parts that this adjustment may be made without in any way interfering with the belt drive or changing the tension on the belt.

With the above and other objects in view, and to improve generally on the details of such equipment, the invention consists in the construction, combination and arrangement of parts hereinafter described and claimed, and illustrated in the accompanying drawings, forming part of this specification, and in which:

FIG. 1 is a plan view of the combined mower and edger, complete;

FIG. 2 is a side elevation thereof;

FIG. 3 is a front view thereof;

FIG. 4 is a fragmentary perspective view on an enlarged scale showing the edger driving and adjusting mechanism;

FIG. 5 is a vertical section taken substantially on the line 5—5 of FIG. 4;

FIG. 6 is a fragmentary vertical section on an enlarged scale showing the engine base and shaft, the supporting means therefor, and the power take-off pulley mounted on said shaft;

FIG. 6a is a perspective view of the spacing ring on which the engine base is supported;

FIG. 7 is a fragmentary perspective view on an enlarged scale, showing the means for holding the edger in any desired adjusted position;

FIG. 8 is a fragmentary vertical section illustrating one of the ways in which my improved edger may be used, parts being in elevation, and FIG. 9 is a perspective view of a belt guide which I may employ.

Referring to the drawings in detail, my improved mower comprises a wheeled carriage having a flat deck or platform 1, formed of sheet steel, or the like, having its front edge turned down to provide a vertically disposed flange 1b, as shown in FIGS. 3 and 4. The carriage includes the usual wheels 2, on which the deck is supported. The usual or any suitable steering handle 3 is pivotally secured to the deck, and extends rearwardly therefrom.

An internal combustion engine 4, having a base 5, is supported above the deck 1, as shown in FIGS. 2 and 3. This engine has a vertical shaft 6, extending downwardly through the deck 1, and carrying at its lower end the usual blade 7, rotating in a horizontal plane, as shown in FIG. 6.

Also as shown in this figure, the deck 1 is formed with an upstanding ring or boss 1a, and resting on this boss is a spacing ring 8, the shape of which is best shown in FIG. 6a. The engine base 5 rests on this spacing ring, and bolts 9 pass through registering holes in the base 5, ring 8 and boss 1a, to secure the parts rigidly together.

A power take-off pulley 10 is mounted on the engine shaft 6 within the spacing ring 8, and is secured thereto by means of a countersunk set screw 11. A guard pin 12 may be set in the deck adjacent the pulley 10 to prevent the drive belt from jumping off. The spacing ring 8 must necessarily be formed with a gap 8a as shown in FIGS. 6 and 6a to provide a throughway for the passage of the driving belt. A Bowden wire or other suitable control 13 extends from the engine rearwardly to the handle 3.

Secured, as by welding, to the front turned down edge 1b of the deck 1 is a bar 14, carrying a pair of forwardly projecting lugs 15, and extending through these lugs is a horizontal shaft 16. A rectangular frame, made up of a pair of vertical members 17 and a pair of horizontal members 18 and 19 is pivotally mounted near the bottom bar 18 on this shaft, and another shaft 20, parallel with the shaft 16, is supported in the upper ends of the vertical members 17. On one end of the shaft 20, adjacent to but outside of one of the members 17 is journalled a double pulley 21, 22, and a belt 23 runs around the pulley 21 of the pair, and around the power take-off pulley 10 on the engine shaft, as clearly shown in FIG. 4. This belt 23 passes through the gap 8a in the spacing ring 8, as shown in FIG. 6.

A bell crank lever has one arm 24, which is substantially horizontal, journalled on the shaft 20, being held in position longitudinally of the shaft by means of a pair of collars 25, secured to the shaft. The other end of the bell crank lever extends vertically, and terminates in a handle 31. Pivoted at 30 to the bell crank lever, at the point where its arms join, is one end of a link 26, the other end of which is pivoted at 27 between a pair of upstanding fixed lugs 28, secured as by welding to the deck 1 at a point a substantial distance to the rear of the shaft 20. A stop member 29 is associated with the link 26 to limit its pivotal movement, as hereinafter described.

It will thus be understood that the arm 24 and link 26 together constitute a toggle-link arrangement, movable to a position either above or slightly below a line connecting the centers of shaft 20 and pivot pin 27. In the position shown in FIG. 4, in which the pivot pin 30 is slightly below the center line, and the link 26 is resting against the stop 29, the shaft 20 is maintained in operative position, holding the driving belt 23 under sufficient tension to cause it to transmit power from the pulley 10 to the pulley 21. If it is desired to loosen the belt so that it will slip, and power be no longer transmitted, the operator pulls the handle 31 forward, as indicated by the arrow in FIG. 4. This moves the pin 30 up above the center line, and "breaks" the toggle, thus releasing tension on the drive belt 23. It will be understood that when the toggle is thus "broken," the shaft 20 moves rearwardly, such motion being permitted by the frame 17, 18, 19 swinging on its pivot 16.

I preferably provide a belt guide comprising a curved rod 23a partially embracing loosely the pulley 21 over which the drive belt 23 passes. This guide rod lies in a vertical plane and has at its lower end a short horizontal portion 23b which extends through an opening in the member 17, and is rigidly secured thereto by means of a pair of nuts 23c.

It will thus be seen that when the frame 17, 18, 19 is swung on its pivot 16, to disengage the drive as described, the curved rod 23a will engage the belt 23 and prevent it from jumping off the pulley 21, at the same time holding the belt so as to cause the rear end to become loose and slip on the power take-off pulley 10, thus eliminating any crawling tendency of the belt.

I preferably provide a tension spring 30a having one end connected to the pin 30, while the other end is connected with the shaft 20, as by passing it through a hole drilled in the shaft. The tension of this spring tends to hold the arm 24 down in drive position, as shown in FIG. 4, and when in disengage or release position it tends to hold the frame 17, 18, 19 firmly against the front of the mower deck. In other words, the spring provides a good "snap" action in the toggle.

Mounted on the shaft 20, just inside of the vertical frame members 17, are a pair of arms 34, extending forwardly from said shaft. Each of these arms is made up of a pair of overlapping sections 32, 33, these sections being united by bolts 35. The ends of sections 33 are drilled to take the shaft 20, while the ends of the sections 32 are secured as by welding to a sleeve or hollow shaft 36.

Journalled in bearings 37 and 38 inside the sleeve 36 is a shaft 39, to which is secured, at the right hand end, as viewed in FIGS. 4 and 5, as by means of a set screw 41, a pulley 40, around which, and the pulley 22 passes a belt 42. Oil cups 43 may be mounted on the sleeve 36.

At the left hand end of the shaft 39 is secured an edger blade 44, operating in a vertical plane. A shield or guard 45 is preferably mounted on the sleeve 36 to partially enclose the blade 44. This guard 45 is carried by a split sleeve 45a, fitting over the sleeve 36, and provided with a pair of lugs through which passes a bolt 45b. This provides a means for adjusting the angular position of the guard to adapt it for use either when the edger is working in a raised position, as in FIG. 8, or at ground level. By loosening the bolt 45b the guard may be turned as desired around the sleeve 36, and then, by tightening the bolt, clamped in adjusted position. The sleeve 36 and shaft 39 are advantageously of such length as to position the edger blade at a point spaced a substantial distance laterally from the wheels 2, as best shown in FIGS. 1, 3 and 8.

Rigidly secured as by welding to the section 33 of one of the arms 34 is an upwardly projecting lever 46, and extending rearwardly from the upper end of this lever is a control rod 47. At its rear end, this rod has a flattened portion 48, provided at its lower edge with a series of square sided notches 48a (see FIGS. 2 and 3), adapted to engage the edge of a similarly shaped bracket 40, mounted on the handle 3. The notched portion 48 of the rod passes through a keeper 49, forming part of the bracket 50.

From the foregoing, it will be seen that, by lifting the rear end of the rod 47, the notches 48a may be disengaged from the edge of the bracket 50, and the rod then moved back and forth through the keeper as desired. The movement of the rod 47 serves to swing the lever 46 and thus rock the arms 34 on the shaft 20, thereby raising or lowering the hollow shaft or sleeve 36, and with it the edger blade 44. When the edger has thus been moved to the desired position, it may be locked in such position by engaging one of the notches 48a with the edge of the bracket 50.

It will be noted that in thus adjusting the height of the edger shaft, it swings about the axis of the shaft 20, on which the pulley 22 is mounted, and therefore the distance between the shafts 20 and 29 remains constant, so that the tension on the edger driving belt 42 is not affected.

It will be observed that my improved edger attachment comprises a first frame, made up of the members 17, 18, 19, pivotally mounted on the mower body by means of the shaft 16, and a second frame, made up of the arms 34, shaft 20, and sleeve 36, pivotally carried by said first frame. The position of the first frame is controlled by the toggle mechanism 24, 26, 31, and the position of the second frame is controlled by lever 46 and rod 47.

One reason for positioning the edger at a point spaced a substantial distance laterally from the mower wheels is illustrated in FIG. 8. This figure shows a curb X extending along one side of a lawn Z, and a pavement Y outside of the curb. By elevating the edger blade as shown, the edger may be made to straddle the curb, while the wheels 2 run on the sidewalk, so that the blade may trim the long grass which frequently tends to climb up or over the curb, presenting an unkempt appearance.

By adjusting the edger to other positions it may be used to trim around flower beds, or along the sides of hard surfaced walks.

The edger attachment may be readily detached from the mower, when desired. To do this, all that is necessary is to remove the cotter pin 16a from the right hand end of shaft 16 (see FIG. 4), when this shaft can be withdrawn to the left, thus permitting the removal of both front frames, the pin 27 being also taken out to release the toggle, and the rod 47 being withdrawn from the keeper 49. The main drive belt 23 would be left lying on the deck.

If the mower itself is sold without the edger attachment, it will be equipped with the power take-off pulley 10, the lugs 28, and the bar 14 and mounting lugs 15. If the purchaser comes back at a later date and wants to buy the edger attachment, all the dealer has to do is to install the main drive belt, and attach the edger mechanism as above described.

What I claim is:

1. A lawn mower comprising a wheeled carriage having a substantially horizontal deck, a motor having its base supported by said deck and having a substantially vertical shaft extending through said deck, an elongated rotatable blade secured to said shaft underneath said deck, means interposed between said deck and motor base for spacing the latter a substantial distance vertically above the former, a power take-off pulley secured to said shaft at a point above the horizontal plane of the deck, and within the space between said deck and motor base, and a driving belt running over said pulley.

2. A lawn mower in accordance with claim 1 in which the spacing means consists of a partial ring surrounding said pulley and having at one side a gap constituting a through way for a driving belt, and a plurality of bolts passing through aligned holes in said motor base, partial ring and deck.

3. A lawn mower and edger comprising, in combination, a wheeled carriage having a substantially horizontal deck, a motor having its base supported by and above said deck in spaced relation thereto and having a substantially vertical shaft extending downwardly through said deck, an elongated rotatable blade secured to the lower end of said shaft, a power take-off pulley secured to said shaft at a point between said motor base and said deck, a substantially horizontal, transversely extending edger shaft rotatably mounted at the front end of said carriage, an edger blade secured to one end of said edger shaft and arranged to rotate at all times in a substantially vertical plane, and belt means for driving said edger shaft from said pulley.

4. A lawn mower and edger according to claim 3 in which the plane of rotation of said edger blade is disposed permanently a substantial distance laterally from the side of said carriage, whereby the adjacent wheels of the carriage and said edger blade may straddle and operate on opposite sides of an elevated curb, or the like.

5. A lawn mower and edger in accordance with claim 3 in which means are provided for raising and lowering the edger shaft as desired, while the machine is in operation, and for holding it in any selected adjusted position.

6. A lawn mower and edger in accordance with claim 3 in which toggle-lever means are provided for releasing the tension on said driving belt so as to cause it slip, when it is not desired to operate said edger shaft.

7. A lawn mower and edger in accordance with claim 5, in which the driving means for said edger shaft includes a double pulley, a belt running over said power take-off pulley and one side of said double pulley, a pulley on said edger shaft, a second belt running over said last named pulley and the other side of said double pulley, the means for raising and lowering said edger shaft comprising a frame mounted to swing about the axis of said double pulley, whereby swinging said frame to raise and lower said edger shaft has no effect on the tension of the said second belt.

8. An edger attachment for lawn mowers having a wheeled carriage, said attachment comprising a rectangular transversely extending vertically disposed first frame pivotally mounted at the front of said carriage to swing about a horizontal axis, a second frame comprising a shaft supported in the upper part of said first frame and parallel with said axis, a pair of forwardly projecting arms at least one of which is rigidly secured to said shaft, an edger shaft rotatably carried by the ends of said arms, and an edger blade secured to one end of said edger shaft.

9. An attachment in accordance with claim 8, in which the means by which the edger shafts is rotatably carried by said arms comprises a sleeve through which said edger shaft extends and in which it is journalled, said arms being rigidly secured to said sleeve at longitudinally spaced points.

10. An edger attachment for lawn mowers having a wheeled carriage, said attachment comprising a transversely extending bar rigidly secured to the front of the carriage, a pair of spaced bearing lugs carried by said bar, a transversely extending, substantially vertically disposed first frame, a quick-detachable shaft pivotally connecting said frame with said lugs, means for angularly adjusting said frame about said shaft, a second frame pivotally mounted in the upper part of said first frame, a transversely extending edger shaft rotatably carried by said second frame and positioned forward of said first frame, and edger blade secured to one end of said edger shaft, and means for swinging said second frame on its pivot to raise and lower said edger shaft.

11. A lawn mower and edger comprising, in combination, a wheeled carriage having a substantially horizontal deck, a motor having its base supported by and above said deck in spaced relation thereto and having a substantially vertical shaft extending downwardly through said deck, an elongated rotatable blade secured to the lower end of said shaft, a power take-off pulley secured to said shaft at a point between said motor base and said deck, a substantially horizontal, transversely extending edger shaft rotatably mounted at the front end of said carriage, an edger blade secured to one end of said edger shaft, means for driving said edger shaft comprising a driven pulley, a driving belt running over said driven pulley and said power take-off pulley, means for releasing the tension on said driving belt so as to cause it to slip when it is not desired to operate said edger shaft, and means for ensuring that such slippage takes place on said power take-off pulley only.

12. A lawn mower and edger comprising a wheeled carriage, a motor supported on said carriage, grass cutting means driven by said motor, a substantially horizontal, transversely extending edger shaft rotatably mounted at the front end of said carriage, said shaft projecting laterally to one side of said carriage a distance greater than the average width of the usual elevated curb, an edger blade secured to the projecting end of said shaft, means whereby said shaft may be adjusted vertically to extend above such curb, whereby the adjacent wheels of the carriage and said edger blade may operate on opposite sides of said curb, and means whereby said shaft is driven by said motor.

References Cited by the Examiner

UNITED STATES PATENTS

| 2,707,858 | 5/1955 | Norton et al. | 56—25.4 |
| 3,019,585 | 2/1962 | Wellborn | 56—25.4 |
| 3,114,229 | 12/1963 | Wilson | 56—25.4 |
| 3,192,693 | 7/1965 | Bergeson | 56—25.4 |

ABRAHAM G. STONE, *Primary Examiner.*

RUSSELL R. KINSEY, *Examiner.*